Sept. 23, 1969     MASANOBU NAKAMURA     3,468,007

INTEGRAL PUSH ROD AND METHOD OF MAKING SAME

Filed Sept. 19, 1967

INVENTOR

MASANOBU NAKAMURA

BY *MacGlew and Toren*

ATTORNEYS 3,468,007
Patented Sept. 23, 1969

3,468,007
INTEGRAL PUSH ROD AND METHOD OF MAKING SAME
Masanobu Nakamura, 22–8 Matsubara-cho, 5-chome, Setagaya-ku, Tokyo, Japan
Filed Sept. 19, 1967, Ser. No. 668,807
Claims priority, application Japan, Sept. 22, 1966, 41/62,311; Mar. 23, 1967, 42/17,707
Int. Cl. B23p *13/00;* B21k *1/20*
U.S. Cl. 29—156.7          3 Claims

ABSTRACT OF THE DISCLOSURE

A method of making an integral push rod from a separate end member and stem member comprised of the steps of shaping the end member to provide a curved contacting surface and a tubular socket-like opening, forming an axially elongated tubular stem member with outside dimensions at one end sufficient to fit closely within the tubular socket-like opening of the end member, inserting the stem member into the end member and applying pressure to the stem member and the end member whereby the stem member is axially compressed and expands radially into intimate binding contact with the end member.

An integral push rod comprised of an axially elongated tubular stem member having a reduced wall thickness at one end, and an end member fitted in intimate binding contact onto the end of the stem member. The end member has cylindrical side walls closed at one end by a curved wall section and open at the other end to receive the end of the stem member. The wall thickness of the stem member for approximately its length inserted into the end member is reduced by increasing its inside diameter. The end member is preferably hardened and its closed wall section may be spherical in shape with its outer surface having either a concave or convex form.

Summary of the invention

The present invention is directed to an integral push rod and to a method of making the push rod, and more specifically, to the arrangement for intimately securing the end member of the push rod onto the stem member.

At the present time, push rods are manufactured by welding or soldering end members to the ends of metal tubes or rods. Such push rods have been made by forging or by monobloc machine-cutting. The end surfaces of push rods which engage other moving mechanical parts must have a smooth surface and be resistant to abrasion. However, it is not necessary for the stem of the push rod to have a special abrasion resistance or a particularly smooth surface, but it is important that it have sufficient strength to withstand a buckling load. Generally, the end or contacting surfaces of a push rod are hardened, however, the hardening produces a harmful effect on the stem inducing distortion and sometimes increasing its brittleness. Another problem involved in manufacturing push rods by welding, forging or similar operations is that special machines and tools are required and skilled laborers are needed to perform these operations.

Accordingly, the primary object of the present invention is to combine a separate end member and stem member into an integral push rod which is simple to fabricate and does not include any of the disadvantages present in the prior art.

Another object of the invention is to provide a simple method for making an integral push rod.

Still another object of the invention is to form the contacting surfaces of the members forming the integral push rod to assure that they are interconnected in intimate binding contact.

Moreover, another object of the invention is to provide a push rod which is economical in cost, and one whose individual parts have the requisite characteristics for continuous operation without failure due to wear or other defects.

Accordingly, in the present invention, the push rod is fabricated from an end member and a stem member. The end member is formed by shearing a disk from a strip of metal and simultaneously drawing the disk into a cup-shaped member having a closed curved wall section whose outer surface may be either convex or concave and with cylindrical sidewalls forming a tubular socket-like opening. The end member is hardened to provide it with the required resistance to abrasion and its closed wall section, which forms its contacting surface, is ground smooth to provide proper interaction in the transmittal of mechanical power or energy to another machine part. The stem member of the push rod is formed by cutting axially elongated hollow tubes to the desired length. The end of the stem member to be fitted into the end member has a reduced wall thickness which can be accomplished by grinding or cutting either the inner or outer wall surface of the member. The opening formed by the cylindrical sidewalls of the end member has a diameter slightly larger than the end of the stem member so they can be easily fitted together. Next, the stem member is fitted into the end member and the two parts are fitted into a suitable device for applying pressure against the end member in the direction of the stem member. Due to the pressure exerted along the axis of the stem member, there will be a tendency for it to compress axially and at the same time to expand or deform in a radial direction. With the end member held against the end of the stem member and the stem member deforming radially outward, the two members are forced into intimate permanent binding contact forming an integral push rod.

The interconnecting sections of the stem member and end member are especially shaped to provide the proper interaction when the stem member is forced into the end member. In an alternate embodiment, grooves are formed either axially along or annularly about the inner surface of the stem member to assure that its outer surface will properly flow into a contact with the inner surface of the end member.

Another embodiment employs an annular groove in the inner surface of the end member into which a portion of the outer surface of the stem member is forced during the interconnecting step. Moreover, the inner surface of the end member may be shaped to provide a locking recess for the end of the stem member or it may be provided with a configuration which will force or direct the stem member into a wedging type engagement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Detailed description

Figure 1:
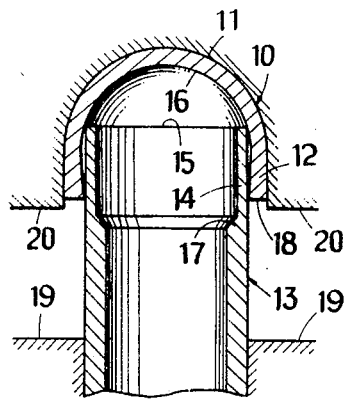
FIG. 1 is a partial longitudinal sectional view of an end member and a stem member arranged to be interconnected in accordance with the present invention.
Figure 2:
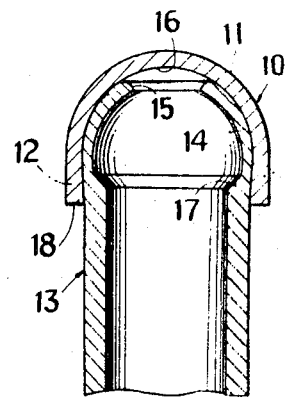
FIG. 2 is a partial longitudinal sectional view of the end member and stem member shown in FIG. 1 after they have been joined together.

In FIG. 1, an end member 10 and a stem member 13 are shown in assembled arrangement about to be interengaged to form an integral push rod as shown in FIG. 2. The end member 10 has a cup-like shape with a closed end 11 formed by a spherically shaped wall section with a convex outer surface and a cylindrical sidewall 12 extending from the closed end 11. In this arrangement, the spherical end surface 11 acts as a ball member in a ball and socket joint. To provide proper abrasion resistance, the end member 10 is hardened and its spherical surface is ground to obtain a smooth working surface. At its open end 18, the sidewall 12 has an increased wall thickness as compared to the remainder of its length, and accordingly, the inner surface of the sidewalls diverge outwardly from the open end 18 to the point where the sidewalls 12 meet the spherically-shaped end surface 11. It is, however, noted that the divergence of the inner surface of the sidewalls 12 of the end member is not critical. In the axial direction the sidewalls may have the same diameter.

The stem member 13 is formed of an axially elongated tubular section and, as shown in FIG. 1, extending from its end 15 it has a wall section 14 of reduced thickness. An annular line 17 is located about the inner surface of the stem member defining a division line in the strength of the tubular section between its regular wall section and its end section 14 of reduced thickness.

In joining the end member 10 and the stem member 13 into an integral push rod 8, they are first disposed in the arrangement shown in FIG. 1 with the reduced wall thickness section of the stem member extending partially into the end member 10. Next the members are fitted into a device for providing the necessary force to interconnect. The stem member 13 is secured within a clamping tool 19 mounted on a suitably rigid base (not shown) so that the stem member will not move laterally during the connecting operation. A head 20 on a press (not shown) which is arranged to provide force against the end member 10 in the direction of the stem member. This pressure exerted by the head 20, in turn, provides a compressive force acting axially along the stem member 13. The head 20 is shaped to receive the spherical surface of the closed end of the end member and it may be actuated by hydraulic or other well known mechanical means.

As pressure is applied downwardly by the head 20 against the end member 10, the end member transmits this pressure to the stem member and the end 15 of the stem member 13 is pressed against the inner concave surface of the end section 11. With the continuous application of pressure, the reduced wall section 14 of the stem member compresses in an axial direction and expands outwardly into engagement with the inner surface of the end member. When a metallic tube, such as the stem member 13, is subjected to axial pressure, it has a tendency to deform or expand radially outward and to increase its diameter as well as increasing its wall thickness due to the effect of the axial compression. Thus, the pressure applied to the end member by the head 20 forces the wall 14 of the stem member 13 to compress axially and at the same time to expand radially. However, because of the configuration of the inner surface of the end member 10, the end wall section 14 of the stem member rides into the interior of the end member 10 and is wedged into intimate contact with it. It can be appreciated that the smaller the ratio between the diameter of the tube and its wall thickness, the less will be its ability to deform, and, in the arrangement shown in FIGS. 1 and 2, to conform to the interior surface of the end member. As pressure is applied to the stem member and it is forced into the end member, its resistance to deformation will increase and the end of the stem member will stop at a determinable position within the end member. Accordingly, all the pressure then acts on the part of the reduced thickness wall section 14 which is opposite the cylindrical wall 12 of the end member and causes it to expand into tightly fitting contacting relationship with the cylindrical wall. The completion of the interconnection of the end member 10 and the stem member 13 into an integral push rod is achieved with the contacting walls of the two members being in intimate permanent binding contact about their contacting peripheries.

When the pressure is applied through the end member 10 to the stem member 13, the cylindrical sidewall 12 of the end member has a tendency to expand with the expansion of the wall 14 of the stem member. However, any expansion which occurs within the cylindrical sidewall 12 can be ignored since the outward expansion of the stem member into the end member provides a strong anchorage between the two. However, any expansion of the cylindrical sidewall 12 of the end member 10 at its end 18 may be avoided by clamping the peripheral edge 18 of the metal piece from the outside by any suitable clamping means mounted on the head 20 of the press (not shown).

An improved binding force is achieved between the end member and the stem member by the tapered or outwardly diverging wall surfaces on the interior of the cylindrical sidewall 12. As illustrated in FIG. 1, the inner wall surface of the cylindrical sidewall 12 has an outwardly tapering disposition from the open end 18 inwardly toward the end section 11. Therefore, as pressure is applied to the stem member, a bulbous expansion of the end 14 of the stem member will occur within the tapered portion of the cylindrical sidewall.

When the end member 10 and the stem member 13 have been bonded together in the arrangement illustrated in FIG. 2, the stem member becomes a permanent integral part of the end member and their interconnection is substantially equal to that of either welding or soldering.

Figure 3:
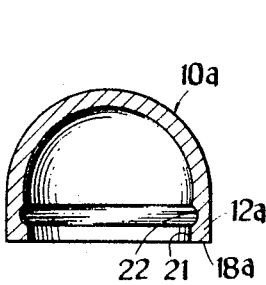
FIG. 3 is a sectional view through another embodiment of an end member similar to the one shown in FIGS. 1 and 2.

In FIG. 3, there is illustrated a modified end member 10a, generally similar to that shown in FIG. 1, which is capable of providing an improved interconnection between the stem member 13 and the end member 10a. The end member 10a has a cylindrical sidewall 12a with an annular recess 22 formed in its inner wall surface 21. The recess is located slightly inwardly from the opening 18a of the end member. When pressure is applied to the end member 10a, plastic deformation will take place in the stem member 13 and a portion or annular protuberance on the outer surface of the stem member will flow into the groove or recess 22 in the end member 10a resulting in a greater interlocking engagement between the two members. The annular recess 22 in the end member is positioned to register with the line 17 at the end of the reduced section 14 of the stem member because compressive stress will be concentrated at this line and will provide the optimum conditions for flowing the stem member into the recess 22.

The ability of the tubular stem member 13 to deform and expand radially outward is due to the reduction in its wall thickness and to the existence of the line 17 where a discontinuity exists between the strength of the tube at its full wall thickness as compared to that at its reduced wall thickness section 14. However, the ratio of diameter of the tubular section to its wall thickness is obviously limited to a certain range. If the ratio of the diameter to the wall thickness of the stem member 13 happens to be too great and the member is subjected to axial compression, it is likely that the internal stress developed within its tubular section will collapse and buckle the wall of the section. In practice, the ratio of diameter to wall thickness may be fixed by several factors, for example, the strength of the material in the tubular section, its size, the extent of the pressure exerted on the end member by the press, etc.

Figure 4:
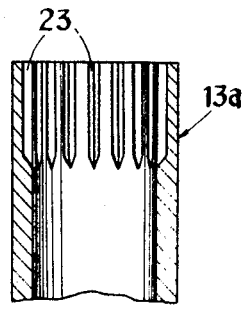
FIGS. 4 and 5 are partial longitudinal sectional views of alternate embodiments of stem members similar to the one shown in FIG. 1.
Figure 5:
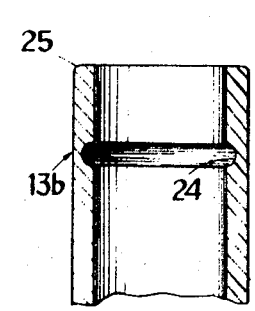

The ability to deform the end portion 14 of the stem member 13 can also be achieved by employing the modifications shown in FIGS. 4 and 5. In FIG. 4, the stem member 13a has a plurality of axially extending grooves 23 in its inner surface, the grooves extend for about the same dimension as the reduced wall thickness section 14 shown in FIG. 1. In FIG. 5, an annular groove 24 is provided in the stem meber 13b and, in addition, the end 25 of the tube 13b at its outer edge is rounded to permit the wall of the tube to deform inwardly along the surface of the end member without injury to the two members being interconnected.

Figure 6:
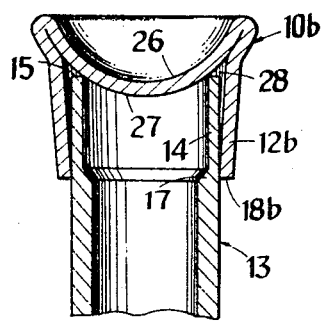
FIG. 6 is a partial longitudinal sectional view of another embodiment of an end member and a stem member for forming an integral push rod.

The shape of the closed end surface 11 of the end member 10 is not limited to any special contour but is determined by the particular shape of the contacting surface with which the push rod interacts. In FIG. 6, the end member 10b illustrates a configuration different from the one shown in FIG. 1 with an inwardly directed spherical closed end 26. Though its outer surface is concave, the end member 10b can still be used in a joint with another machine part. The cylindrical sidewall 12b of the end member 10b has an outwardly diverging or tapering arrangement which terminates at the closed end section 26.

In FIG. 6, the stem member 13 is shown inserted into the end member 10b before pressure is applied for integrally connecting the two members. In this initial assembly, the end 15 of the stem member 13 contacts the inner surface 27 of the end member 10b. As axial pressure is applied through the end member 10b, the end 15 of the stem member is forced against the inner surface 27 of the end member and a force is exerted on the reduced thickness wall section 14 causing it to compress axially. In addition, the end 15 of the stem member is forced radially outwardly into the tapered recess 28 formed between the inner surface 27 and the tapered sidewall 12b of the end member. After the axial pressure on the stem member 13 reaches a certain limiting value, the wall of the wall 14 of the stem member will begin to deform or expand radially outwardly into the recess 28. In this arrangement, the line 17 between the wall section 14 and the remainder of the stem member 13 is located within the end member 10b. As the application of pressure continues with the end 15 of the stem member 13 secured within the recess 28, the continued expansion of the wall section 14 of the stem member 13 takes place between the line 17 and the end 15.

To assure increased strength in the interconnection of the end member 10b and the stem member 13, the sidewall 12b of the end member may be tapered to provide a reduced diameter at the opening 18b, as is shown in FIG. 6. Due to the tapered arrangement of the wall 12b, the expansion of the end section 14 of the stem member will be accelerated, resulting in a greater interlocking engagement between the two members. The device for exerting pressure through the end member 10b to the stem member 13 may be provided, with a clamping tool to prevent any probable expansion of the sidewall 12b at its opening 18b.

Figure 7:
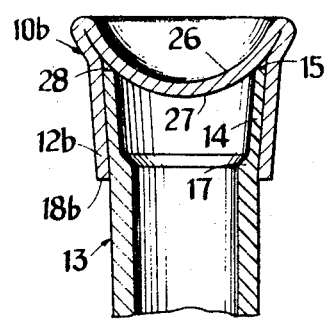
FIG. 7 is a partial longitudinal sectional view similar to FIG. 6, however, with the end member and the stem member arranged in interconnected relationship.

In FIG. 7, the end member 10b and stem member 13 are shown in integrally interconnected relationship with the opposed surfaces of the end member 10b and the stem member 13 arranged in intimate, permanent, binding contact.

While specific embodiments of the invention have been shown and described in detail to illustrate the application of the inventive principles, it will be understood that the invention may be embodied otherwise without departing from such principles.

What is claimed is:
1. A method of makin gan integral push rod from an end member and a separate stem member comprising the steps of shaping the end member to form a tubular socket-like section open at one end and closed at the other end by a spherical wall section, hardening the end member and forming a smooth contacting surface on the exterior of the spherical wall section, forming an axially elongated stem member having a tubular shape for its entire length, providing the stem member with an outside dimension sufficient to fit closely within the socket-like section of the end member, decreasing the wall thickness of the end of said stem member for approximately the length to be inserted into the end member by increasing its interior dimension and thereby providing a transversely extending division line in the strength of the stem member between its regular and its decreased thickness wall section, inserting the reduced wall thickness end of the stem member into the end member, applying pressure through the end member to the stem member with the pressure being applied to the stem member in its axial direction for axially compressing and radially expanding the stem member into intimate binding contact with the interior of said end member.

2. A method of making an integral push rod, as set forth in claim 1 comprising the step of forming an annular recess within the inner wall in the opening of the end member and expanding the outer surface of the stem member outwardly into interlocking engagement with the annular recess.

3. A method of making an integral push rod, as set forth in claim 1 comprising the step of flaring the inner wall of the tubular socket-like opening in the end member to provide it with an increasing interior diameter inwardly from the entrance to the opening.

References Cited

UNITED STATES PATENTS

| | | | |
|---|---|---|---|
| 2,434,080 | 1/1948 | Rosa | 74—579 |
| 2,897,805 | 8/1959 | Etzler | 123—90 |
| 3,209,437 | 10/1965 | Voorhies | 29—522 XR |

FRED C. MATTERN, Jr., Primary Examiner

M. ANTONAKAS, Assistant Examiner

U.S. Cl. X.R.

29—522; 74—579; 123—90